March 28, 1961     P. A. MARSAL ET AL     2,977,401
CATHODES
Filed Oct. 9, 1957
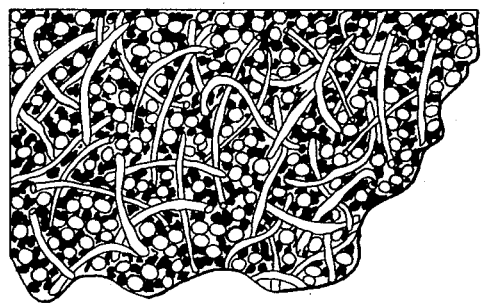
○     Cathode Depolarizer
↝     Conductive Fibres
●     Carbon or Graphite Particles
INVENTORS
PAUL A. MARSAL
LEWIS F. URRY
ANDREW TASCH
BY *John F. Hohmann*
ATTORNEY 2,977,401
Patented Mar. 28, 1961

2,977,401
CATHODES

Paul A. Marsal, Rocky River, Lewis F. Urry, Parma, and Andrew Tasch, Lakewood, Ohio, assignors to Union Carbide Corporation, a corporation of New York Filed Oct. 9, 1957, Ser. No. 689,085

8 Claims. (Cl. 136—120)

This invention relates to cathodes for use in dry cells. More specifically it relates to cathodes containing fibrous or filamentary conductive materials.

Cathode elements used in primary dry cells conventionally consist of mixtures of oxidic depolarizers, non-reactive conductive powders and, in some cases, a suitable electrolyte. The mixtures are molded or compressed into a bobbin or plate, and then inserted in the cells. According to prevailing theories relating to the function of the Le Clanche cell, its cathode must contain a large amount of electrolyte, and the same is provided in conventional constructions.

In the Le Clanche cell system, graphite and acetylene black generally are the conductive powders. In other systems the conductive component in the cathode element may include metal powders such as nickel powder. The oxidic depolarizer may be manganese dioxide, vanadium pentoxide, nickel hydroxide and the like. In most dry cell systems the described cathode is juxtaposed with a high liquid content medium such as a paste electrolyte. Since the cathode is merely a pressed mass of independent particles, some of which are fairly absorbent, it is only a question of time until the mix, acting as a sponge, soaks up liquid, swells, disturbs its particle to particle contact and displays increased, if not prohibitively high, resistance. This behavior can occur in a short time ranging from a few days to a week, regardless of molding pressure or particle size of mix unless physically retained by a suitable container.

It has been found in accordance with the invention that the integrity of compressed cathode bodies can be largely retained if a fibrous or filamentary conductive material is used in the mix from which such bodies are formed.

The principal object of the present invention then is to provide improved means and methods for maintaining a low level of resistance in cathodes during cell life by ensuring intimate contact between the components thereof.

The single figure accompanying this disclosure is a fragmentary view, substantially enlarged of a cathode in accord with the invention.

The electrodes of the invention comprise finely divided particles of oxidic depolarizing materials, together with carbonaceous particles, and a filamentary conductive material. Among the depolarizing materials used in making cathodes for various cell systems are manganese dioxide, both electrolytic and synthetic, mercuric oxide, silver oxide, copper oxide, vanadium pentoxide, nickel oxide and the like.

Suitable carbonaceous particles incorporated in the cathode of the invention include carbon black, acetylene black, graphite and mixtures thereof.

The fibers of value in the practice of the invention include chopped or shredded steel wool, iron wool or nickel wool, as well as conductive non-metallic fibers. Such fibers may be of the so-called natural type as asbestos and cotton or of the synthetic type such as rayon, resinous copolymers of vinyl chloride and acrylonitrile containing around 60 percent of the vinyl chloride in the polymer, such as "Dynel," a material disclosed and claimed in the patent of Ruggeley et al. (U.S. 2,420,565), and vinyl chloride-vinyl acetate copolymers containing from 80 percent to 96 percent of vinyl chloride and marketed under the name "Vinyon." These fibers may be made electrically conductive by various methods such as metallizing or by coating them with graphite. It is necessary, of course, that the metallic or metal-coated non-metallic fibers be inert to the electrolyte used in the cell system. Thus, for example, in an alkaline system using manganese dioxide as the depolarizing agent such as in the cell disclosed and claimed in the co-pending application of L. F. Urry et al., Serial No. 689,084, filed October 9, 1957, chopped or shredded steel wool is used in conjunction with an alkaline medium.

Generally the fibers suitable for use in this invention should have a length considerably greater than their diameter, the length being appreciably greater than that of conventional metal granules or metal powders. The filaments of fibers are not woven, that is, they are not twisted, piled up or converted to fabric form. These filaments satisfactorily may have a diameter of between 0.0005 and 0.010 inch and a minimum length of $\frac{1}{16}$ inch. The maximum length should be as great as possible, commensurate with the problem of handling the material in the mix, and may extend up to about $\frac{1}{2}$ inch.

The proportion of filamentary binder conductor material in the cathode mix may vary over a wide range as long as a sufficient amount thereof is present to materially improve the integrity of the cathode body and diminish its electrical resistance. The maximum quantity is dictated by cost and handling problems. It has been found that about 5 percent by weight of the total weight of the cathode composition gives a good improvement in performance. A preferred range of metal filament content when the metal is steel wool is from about 1 percent to about 20 percent on a weight basis. When fibers other than steel are used, their density must be taken into account. Generally a preferred range of proportions is 2:1 to 16:1 by weight of manganese dioxide to carbon; 5 percent to 20 percent by weight of electrolyte and from 1 to 20 weight percent of finely-divided metallic wool.

The cohesive properties of the fibrous additives are of such effectiveness that molded cathodes of such mix remain intact even after long periods of immersion in water. This effect is due to the fact that the fibers felt together during mixing, and mix cake formation, to give an inter-woven mat which holds the mass together.

The cathodes of the present invention may be packed in a manner similar to the injection molding of plastics, or may be compression molded.

The following example illustrates the practice of the invention.

A cathode was made from the following:

| Material: | Percent by weight |
|---|---|
| Manganese dioxide | 73 |
| Acetylene black | 1 |
| Graphite | 10 |
| Steel wool (#0000) | 5 |
| Potassium hydroxide solution (27 percent by volume) | 11 |

The steel wool was prepared by first chopping it into short lengths ranging from $\frac{1}{10}$ to $\frac{1}{4}$ inch. The wool was then chopped in a food mixer of the type known under the trade names of Waring Blender or Osterizer. These devices consist essentially of a set of blades rotating at high speed. Their effectiveness for the purposes herein is improved by tipping back and forth through as much as 180° while in operation. In this manner the steel wool is conditioned into a fluffy state, such that it will mix uniformly with the other cathode constituents. Next the dry ingredients of the mix were blended for about 15 minutes in a rotating tumbling drum. The electrolyte was added to the mix, and the mixing action was continued until a uniform blend was obtained. The mix was then formed into pre-determined shapes.

As previously stated, metallic particles may be replaced by an equal weight of textile fibers or flock. For example, Dynel fibers described as 4 denier, 3 mm. length and supplied by Union Carbide Chemicals Company, a division of Union Carbide Corporation, 30 East 42 Street, New York, N.Y. may be used. In the practice of the invention, such fibers are placed in a mixer such as Osterizer, along with finely divided graphite, and mixed until each fiber is well coated, so as to render the same electrically conductive. When graphite coated fibers are used instead of steel wool, on an equal weight basis, it has been found that the conductivity of the cathode molded therefrom is equal to that obtained with steel wool. Additionally the cathode element is very strong. Owing to density differences between the plastic fibers and the steel fibers, considerably more plastic fibers are present in the cathode mix per unit of volume thereof. Nevertheless, the amount of depolarizer per unit volume of the shaped cathode is reduced very little, because a mix containing non-metallic fibers may be packed more solidly than one containing metallic particles.

Cells employing the filamentary conductor binder additives of the invention exhibit appreciably higher initial short circuit amperage than similar cells without the additive, and maintain this higher amperage over extended storage periods, whereas cells without the additive drop in amperage.

The cathodes of the invention are suitable for use in both primary and secondary dry cells. Their performance in rechargeable cells has exceeded that of prior art cathodes used therein.

What is claimed is:

1. A self-supporting shaped dry cell cathode comprising finely divided oxidic depolarizer material, finely divided carbonaceous particles the weight ratio of depolarizer to carbonaceous particles ranging from 2 to 1 to 16 to 1, from 5 to 20 weight percent of an alkaline electrolyte, and from 1 to 20 weight percent electrically conductive filamentary materials stable in the cathode environment, the length of said filamentary materials ranging from about $1/16$ to about $1/2$ inch, the diameter of said filamentary materials ranging from about 0.0005 to 0.010 inch, said filamentary materials being present in an amount sufficient to materially enhance the integrity of said shaped cathode and diminish its electrical resistance, said amount being lesser both in weight and bulk than said oxidic depolarizer material.

2. The cathode of claim 1 wherein said filamentary materials are selected from the group consisting of chopped steel wool, chopped iron wool, and chopped nickel wool.

3. The cathode of claim 1, wherein said filamentary materials are metallized natural fibers.

4. The cathode of claim 1 wherein said filamentary materials are metallized synthetic fibers.

5. The cathode of claim 1 wherein said filamentary materials consist of synthetic fibers coated with graphite.

6. A self-supporting shaped dry cell cathode comprising from 2 to 1 to 16 to 1 weight ratio of manganese dioxide to carbon, 5 to 20 weight percent alkali hydroxide electrolyte, 1 to 20 weight percent chopped steel wool, said steel wool being uniformly distributed in said shaped cathode, the filaments of said steel wool ranging in length between about $1/16$ inch and about $1/2$ inch, and having a diameter ranging between about 0.0005 and about 0.010 inch enhancing the integrity thereof and diminishing its electrical resistance.

7. The cathode of claim 1 wherein said oxidic depolarizing material is selected from the group consisting of electrolytic manganese dioxide, synthetic manganese dioxide and natural manganese dioxide, mercuric oxide, silver oxide, copper oxide, vanadium pentoxide and nickel hydroxide.

8. The cathode of claim 1 wherein said carbonaceous particles are selected from the group consisting of carbon black, acetylene black, graphite and mixtures thereof.

References Cited in the file of this patent

UNITED STATES PATENTS

| | | |
|---|---|---|
| 793,077 | Hubbell | June 27, 1905 |
| 1,104,898 | Hubbell | July 28, 1914 |
| 2,542,576 | Ruben | Feb. 20, 1951 |
| 2,616,165 | Brennan | Nov. 4, 1952 |
| 2,713,078 | Le Gros et al. | July 12, 1955 |
| 2,794,845 | Grabe | June 4, 1957 |
| 2,810,008 | Bikerman | Oct. 15, 1957 |